United States Patent Office 3,501,312
Patented Mar. 17, 1970

3,501,312
DIRECT POSITIVE SILVER HALIDE EMULSIONS CONTAINING TRIMETHINE CYANINE DYES
John D. Mee and Donald W. Heseltine, Rochester, N.Y., assignors to Eastman Kodak Company, Rochester, N.Y., a corporation of New Jersey
No Drawing. Continuation-in-part of application Ser. No. 609,792, Jan. 17, 1967. This application July 22, 1968, Ser. No. 746,260
Int. Cl. G03c 1/12, 1/28
U.S. Cl. 96—106      13 Claims

ABSTRACT OF THE DISCLOSURE

Trimethine cyanine dyes are provided which contain a 3-indole nucleus which contains either a fused aromatic ring, an alkylene bridge or a 2-heterocyclic substituent. Direct positive emulsions containing these dyes are also provided.

---

This application is a continuation-in-part of our co-pending U.S. patent application Ser. No. 609,792, filed Jan. 17, 1967, now abandoned, and entitled, "Photographic Materials."

This invention relates to novel cyanine dyes, and to new and improved direct positive photographic silver halide emulsions containing certain cyanine dyes.

We have found certain trimethine cyanine dyes which are outstanding spectral sensitizers in direct positive type photographic silver halide emulsions. They provide superior reversal systems, especially with fogged silver halide emulsions, that are characterized by both good speed and desired sensitivity to radiation up to wavelengths in the range of about 650–740 m$\mu$ with maximum sensitivity occurring in most cases in the region of about 630–680 m$\mu$. They are further characterized by increased water solubility and are much better sensitizers in the presence of color forming coupler dispersions, as compared with the corresponding dyes from known 1-alkyl-2-phenyl indoles.

It is, accordingly, an object of this invention to provide a new class of improved and novel, direct positive photographic silver halide emulsions, and more particularly fogged emulsions of this type, containing at least one of the cyanine dyes of the invention. Another object of this invention is to provide novel emulsions as above containing, in addition, a photographic color former. Another object of this invention is to provide novel light-sensitive photographic elements comprising a support material having thereon at least one layer of the novel emulsions of the invention. Another object of this invention is to provide novel cyanine dyes containing certain indole nuclei. Other objects of this invention will be apparent from this disclosure and the appended claims.

In accordance with this invention, we prepare our new class of improved and novel, direct positive photographic silver halide emulsions by incorporating one or more of the cyanine dyes of the invention into a suitable fogged silver halide emulsion. The emulsion can be fogged in any suitable manner, such as by light or with chemical fogging agents, e.g., stannous chloride, formaldehyde, thiourea dioxide and the like. The emulsion may be fogged by the addition thereto of a reducing agent such as thiourea dioxide and a compound of a metal more electropositive than silver such as a gold salt, for example, potassium chloroaurate, as described in British Patent 723,019 (1955).

Typical reducing agents that are useful in providing such emulsions include stannous salts, e.g., stannous chloride, hydrazine, sulfur compounds such as thiourea dioxide, phosphonium salts such as tetra (hydroxymethyl) phosphonium chloride, and the like. Typical useful metal compounds that are more electropositive than silver include gold, rhodium, platinum, palladium, iridium, etc., preferably in the form of soluble salts thereof, e.g., potassium chloroaurate, auric chloride, $(NH_4)_2PdCl_6$ and the like.

Useful concentrations of reducing agent and metal compound (e.g., metal salt) can be varied over a considerable range. As a general guideline, good results are obtained using about .05 to 40 mg. reducing agent per mole of silver halide, and 0.5 to 15.0 mg. metal compound per mole of silver halide. Best results are obtained at lower concentration levels of both reducing agent and metal compound.

The concentration of added dye can vary widely, e.g., from about 50 to 2000 mg. and preferably from about 400 to 800 mg. per mole of silver halide in the direct positive emulsions.

As used herein, and in the appended claims, "fogged" refers to emulsions containing silver halide grains which produce a density of at least 0.5 when developed, without exposure, for 5 minutes at 68° F. in Kodak Developer DK–50 having the composition set forth below, when the emulsion is coated at a silver coverage of 50 mg. to 500 mg. per square foot.

DEVELOPER

| | G. |
|---|---|
| N-methyl-p-aminophenol sulfate | 2.5 |
| Sodium sulfite (anhydrous) | 30.0 |
| Hydroquinone | 2.5 |
| Sodium metaborate | 10.0 |
| Potassium bromide | 0.5 |
| Water to make 1.0 l. | |

The dyes of this invention are also advantageously incorporated in direct positive emulsions of the type in which a silver halide grain has a water-insoluble silver salt center and an outer shell composed of a fogged water-insoluble silver salt that develops to silver without exposure. The dyes of the invention are incorporated, preferably, in the outer shell of such emulsions. These emulsions can be prepared in various ways such as those described in Berriman U.S. Patent 3,367,778, issued Feb. 6, 1968. For example, the shell of the grains in such emulsions may be prepared by precipitating over the core grains a light-sensitive water-insoluble silver salt that can be fogged and which fog is removable by bleaching. The shell is of sufficient thickness to prevent access of the developer used in processing the emulsions of the invention to the core. The silver salt shell is surface fogged to make developable to metallic silver with conventional surface image developing compositions. The silver salt of the shell is sufficiently fogged to produce a density of at least about 0.5 when developed for 6 minutes at 68° F. in Developer A below when the emulsion is coated at a silver coverage of 100 mg. per square foot. Such fogging can be effected by chemically sensitizing to fog with the sensitizing agents described for chemically sensitizing the core emulsion, high intensity light and the like fogging means well known to those skilled in the art. While the core need not be sensitized to fog, the shell is fogged. Fogging by means of a reduction sensitizer, a noble metal salt such as gold salt plus a reduction sensitizer, a sulfur sensitizer, high pH and low pAg silver halide precipitating conditions, and the like can be suitably utilized. The shell portion of the subject grains can also be coated prior to fogging.

DEVELOPER A

| | Grams |
|---|---|
| M-methyl-p-aminophenol sulfate | 2.5 |
| Ascorbic acid | 10.0 |
| Potassium metaborate | 35.0 |
| Potassium bromide | 1.0 |
| Water to 1 liter. | |
| pH of 9.6. | |

Before the shell of water-insoluble silver salt is added to the silver salt core, the core emulsions are first chemically or physically treated by methods previously described in the prior art to produce centers which promote the deposition of photolytic silver, i.e., latent image nucleating centers. Such centers can be obtained by various techniques as described herein. Chemical sensitization techniques of the type described by Antoine Hautot and Henri Saubeneir in Science et Industries Photographiques, vol. XXVIII, January 1957, pages 1 to 23 and January 1957, pages 57 to 65 are particularly useful. Such chemical sensitization includes three major classes, namely, gold or noble metal sensitization, sulfur sensitization, such as by a labile sulfur compound and reduction sensitization, e.g., treatment of the silver halide with a strong reducing agent which introduces small specks of metallic silver into the silver salt crystal or grain.

The dyes of this invention are highly useful electron acceptors in high speed direct positive emulsions comprising fogged silver halide grains and a compound which accepts electrons, as described and claimed in Illingsworth U.S. patent application Ser. No. 619,936 filed Mar. 2, 1967, and entitled, "Photographic Reversal Materials Case C." The fogged silver halide grains of such emulsions are such that a test portion thereof, when coated as a photographic silver halide emulsion on a support to give a maximum density of at least about one upon processing for six minutes at about 68° F. in Kodak DK–50 developer, has a maximum density which is at least about 30% greater than the maximum density of an identical coated test portion which is processed for six minutes at about 68° F. in Kodak DK–50 developer after being bleached for about 10 minutes at about 68° F. in a bleach composition of:

Potassium cyanide—50 mg.
Acetic acid (glacial)—3.47 cc.
Sodium acetate—11.49 g.
Potassium bromide—119 mg.
Water to 1 liter.

The grains of such emulsions will lose at least about 25% and generally at least about 40% of their fog when bleached for ten minutes at 68° F. in a potassium cyanide bleach composition as described herein. This fog loss can be illustrated by coating the silver halide grains as a photographic silver halide emulsion on a support to give a maximum density of at least 1.0 upon processing for six minutes at about 68° F. in Kodak DK–50 developer and comparing the density of such a coating with an identical coating which is processed for six minutes at 68° F. in Kodak DK–50 developer after being bleached for about 10 minutes at 68° F. in the potassium cyanide bleach composition. As already indicated, the maximum density of the unbleached coating will be at least 30% greater, generally at least 60% greater, than the maximum density of the bleached coating.

The silver halides employed in the preparation of the photographic emulsions useful herein include any of the photographic silver halides as exemplified by silver bromide, silver iodide, silver chloride, silver chlorobromide, silver bromoiodide, silver chlorobromide, and the like. Silver halide grains having an average grain size less than about one micron, preferably less than about 0.5 micron, give particularly good results. The silver halide grains can be regular and can be any suitable shape such as cubic or octahedral, as described and claimed in Illingsworth U.S. patent application Ser. No. 619,909 filed Mar. 2, 1967, and entitled, "Direct Positive Photographic Emulsions Case A." Such grains advantageously have a rather uniform diameter frequency distribution, as described and claimed in Illingsworth U.S. patent application Ser. No. 619,948 filed Mar. 2, 1967, and entitled, "Photographic Reversal Emulsions Case B." For example, at least 95% by weight, of the photographic silver halide grains can have a diameter which is within about 40%, preferably within about 30% of the mean grain diameter. Mean grain diameter, i.e., average grain size, can be determined using conventional methods, e.g., as shown in an article by Trivelli and Smith entitlted, "Empirical Relations Between Sensitometric and Size-Frequency Characteristics in Photographic Emulsion Series," in The Photographic Journal, vol. LXXIX, 1949, pp. 330–338. The fogged silver halide grains in these direct-positive photographic emulsions of this invention produce a density of at least 0.5 when developed without exposure for five minutes at 68° F. in Kodak KD–50 developer when such an emulsion is coated at a coverage of 50 to about 500 mg. of silver per square foot of support. The preferred photographic silver halide emulsions comprise at least 50 mole percent bromide, the most preferred emulsions being silver bromoiodide emulsions, particularly those containing less than about ten mole percent iodide. The photographic silver halides can be coated at silver coverages in the range of about 50 to about 500 milligrams of silver per square foot of support.

In the preparation of the above photographic emulsions, the dyes, reducing agents and metal compounds of the invention are advantageously incorporated in the washed, finished silver halide emulsion and should, of course, be uniformly distributed throughout the emulsion. The methods of incorporating dyes and other addenda in emulsions are relatively simple and well known to those skilled in the art of emulsion making. For example, it is convenient to add them from solutions in appropriate solvents, in which case the solvent selected should be completely free from any deleterious effect on the ultimate light-sensitive materials. Methanol, isopropanol, pyridine, water, etc., alone or in admixtures, have proven satisfactory as solvents for this purpose. The type of silver halide emulsions that can be sensitized with the new dyes include any of those prepared with hydrophilic colloids that are known to be satisfactory for dispersing silver halides, for example, emulsions comprising natural materials such as gelatin, albumin, agar-agar, gum arabic, alginic acid, etc., and hydrophilic synthetic resins such as polyvinyl alcohol, polyvinyl pyrrolidone, cellulose ethers, partially hydrolyzed cellulose acetate, and the like.

The dyes, reducing agents and metal compounds of the invention can be used with emulsions prepared with any of the light-sensitive silver halide salts including silver chloride, silver bromide, silver chlorobromide, silver bromoiodide, silver chlorobromoiodide, etc. Particularly useful for direct positive fogged emulsions in which the silver salt is a silver bromohalide comprising more than 50 mole percent bromide. As indicated previously, the dyes of this invention are also useful in emulsions which contain color formers. This is unexpected since related prior art dyes cannot be used in emulsions containing a color former.

The novel emulsions of this invention may be coated on any suitable photographic support, such as glass, film base such as cellulose acetate, cellulose acetate butyrate, polyesters such as polyethylene terephthalate, paper, baryta coated paper, polyolefin coated paper, e.g., polyethylene or polypropylene coated paper, which may be electron bombarded to promote emulsion adhesion to produce the novel photographic elements of the invention.

The novel cyanine dyes of this invention include those having two indole nuclei, each representative nucleus being joined through the 3-carbon atom thereof to one of the respective terminal carbon atoms of a trimethine chain, at least one of said nuclei being 2-aromatically substituted and having a substituent selected from (1) a fused non-heterocyclic aromatic ring, e.g., a fused benzene ring, attached to the benzene ring of the indole nucleus, (2) a 1,7-alkylene bridge, e.g., a 1,7-trimethylene bridge, and (3) a heteocyclic aromatic nucleus, e.g., a pyridyl nucleus, attached to the 2-carbon atom of the indole nucleus.

More particularly the novel cyanine dyes of our invention include those represented by the following general formula:

I.
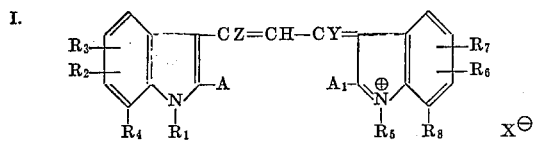
$X^{\ominus}$ wherein A represents a substituent such as a nonheterocyclic aryl radical, e.g., phenyl, tolyl, chlorophenyl, methoxyphenyl, 3,4-dichlorophenyl, napthyl, etc., or a heterocyclic radical containing from 5 to 6 atoms wherein the heteroatom is selected from nitrogen, sulfur, selenium or oxygen, e.g., 2-, 3- or 4-pyridyl, 2-furyl, 2-thienyl, etc. (including their quaternary salts such as 3-pyridyl methobromide, 4-pyridyl methiodide, etc.); $R_2$ and $R_3$ each represents a substituent such as hydrogen, an alkyl radical preferably containing from 1 to 4 carbon atoms, e.g., methyl, ethyl, propyl, isopropyl, butyl, hexyl, decyl, etc., or a halogen atom, e.g., chlorine or bromine, and taken together, the atoms necessary to complete a fused nonheterocyclic aromatic ring having 6 carbon atoms, e.g., a fused benzene ring; $R_1$ represents a substituent such as an alkyl radical (including substituted alkyl) and preferably containing from about 1 to 8 carbon atoms, such as methyl, ethyl, propyl, butyl, octyl, sulfoalkyl such as sulfopropyl or sulfobutyl, sulfatoalkyl such as sulfatopropyl or sulfatobutyl, or carboxyalkyl such as carboxyethyl or carboxybutyl; $R_4$ represents a substituent selected from the values given for $R_2$ and, taken together with $R_1$, an alkylene bridge such as trimethylene or dimethylene; X represents an anion, preferably an anion such as chloride, bromide, iodide, p-toluenesulfonate, thiocyanate, sulfamate, methyl sulfate, ethyl sulfate, perchlorate, etc.; and $A_1$, $R_5$, $R_6$, $R_7$ and $R_8$ each are selected from same values, respectively, as A, $R_1$, $R_2$, $R_3$ and $R_4$; and Z and Y each represents a substituent such as hydrogen, an alkyl radical preferably containing from 1 to 4 carbon atoms, e.g., methyl, ethyl, butyl, hexyl, decyl, etc., and an aromatic radical (including aromatic heterocyclic), e.g., phenyl, tolyl, naphthyl, thienyl, etc.; and wherein at least one of said defined indole nuclei contains a substituent such as said heterocyclic radical, said fused non-heterocyclic aromatic ring or said alkyllene bridge.

The above-defined cyanine dyes of the invention can be conveniently prepared by condensing an indole represented by the general formula:

II.
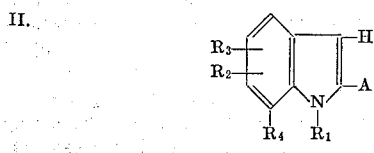

wherein A, $R_1$, $R_2$, $R_3$ and $R_4$ are as previously defined, with a 1,1,3-trialkoxy-2-propene, e.g., trimethoxy-2-propene, in the presence of mineral acid, to give the symmetrical cyanine dyes of the invention.

To prepare the unsymmetrical cyanine dyes of the invention a 3-formyl indole having the formula:

III.
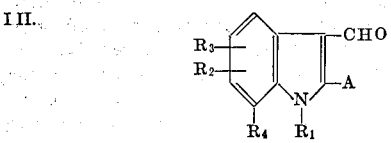

wherein A, $R_1$, $R_2$, $R_3$ and $R_4$ are as previously defined, is condensed with an ethylenic indole having the formula:

IV.
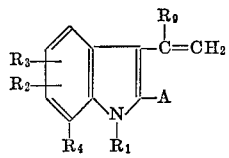

wherein A, $R_1$, $R_2$, $R_3$ and $R_4$ are as previously defined, and $R_9$ represents a substituent selected from the values given for previously defined Z and Y. Condensation in the presence of acid, such as HCl, HBr, $HClO_4$, etc., gives the cyanine dye salt. The intermediate compounds of Formula IV above can be prepared from the corresponding ketones (prepared as described in Wolf et al., German Patent No. 614,326), by reaction with Grignard compounds convert them to ethylenes.

The above condensation reactions are advantageously carried out in an inert solvent medium such as, for example, hot glacial acetic acid, in the presence of a strong mineral acid such as HCl, HBr, $HClO_4$, etc. In some cases, the reaction is advantageously heated at reflux temperature for short periods. After cooling, the products are precipitated from the reaction mixtures by the addition of nonsolvents such as acetone, ether, etc., and then purified by one or more recrystallizations from suitable solvents such as, for example, methanol acidified with acids such as above mentioned. The reactants can be employed in approximately stoichiometrically calculated equivalents, but advantageously the 1,1,3-trialkoxy-2-propene is used in substantial excess of calculated equivalence for the best results.

The invention is further illustrated by the following examples.

EXAMPLE 1

1,1'-dimethyl-2,2'-di-(3-pyridyl)-3,3'-indolocarbocyanine bromide dihydrobromide

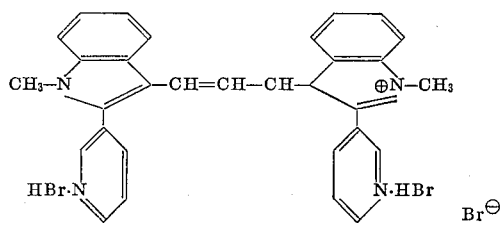

1-methyl-2-(3-pyridyl)indole (1.04 g., 2 mol.) was dissolved in hot glacial acetic acid (10 ml.). Trimethoxypropene (1.0 g., 1 mol. +200%) was added, followed by the dropwise addition of conc. HCl (1 ml.). The mixture was allowed to stand at room temperature for 2 hrs., then diluted with acetone and the solid collected. The dye was dissolved in hot methanol (100 ml.) +48% HBr (1.5 ml.), filtered and the dye allowed to crystallize. The yield of dye was 0.27 g. (16%), M.P. 287–8° C. dec.

A gelatin silver bromoiodide emulsion (2.5 mole percent of the halide being iodide) and having an average grain size of about 0.2 micron is prepared by adding an aqueous solution of potassium bromide and potassium iodide, and an aqueous solution of silver nitrate, simultaneously to a rapidly agitated aqueous gelatin solution at a temperature of 70° C., over a period of about 35 minutes. The emulsion is chill-set, shredded and washed by leaching with cold water in the conventional manner. The emulsion is reduction-gold fogged by first adding 0.2 mg. of thiourea dioxide per mole of silver and heating for 60 minutes at 65° C. and then adding 4.0 mg. of potassium chloroaurate per mole of silver and heating for 60 minutes at 65° C. The above prepared dye, 1,1'-dimethyl - 2,2' - di - (3 - pyridyl) - 3,3' - indolocarbocyanine bromide dihydrobromide was then added to the above fogged emulsion in amount sufficient to give a concentration of 0.176 gram of the dye per mole of silver. The resulting emulsion was then coated on a cellulose acetate film support at a coverage of 100 mg. of silver and 400 mg. of gelatin per square foot of support.

A sample of the coated support was then exposed on an Eastman Ib sensitometer using a tungsten light source and processed for 6 minutes at room temperature in Kodak D-19 developer which has the following composition:

|  | G. |
|---|---|
| N-methyl-p-aminophenol sulfate | 2.0 |
| Sodium sulfite (anhydrous) | 90.0 |
| Hydroquinone | 8.0 |
| Sodium carbonate (monohydrate) | 52.5 |
| Potassium bromide | 5.0 |
| Water to make 1.0 liter. | | then fixed, washed and dried. The results are listed in Table I hereinafter. Referring thereto, it will be seen that the dye of this example had a minimum density in exposed areas of only 0.10, a sensitivity range up to 680 mμ and a maximum sensitivity at 635 mμ, whereas the control sample similarly prepared and tested but containing no spectral sensitizing dye increased in density with exposure. This result indicates that the dye compound of the above example is especially well suited to function as a spectral sensitizer. It thus provides excellent quality direct positive photographic silver halide emulsions. Excellent magenta images were obtained when the color former 1-(2,4,6 - trichlorophenyl) - 3,3' - (2", 4" - di - t - amylphenoxyacetamido)benzimidazo - 5-pyrazolone was incorporated in the emulsion of this example, the emulsion coated on a support, exposed to a tungsten source through Wratten filter No. 61 and No. 16, and reversal processed as described in Graham et al. U.S. Patent 3,046,129, issued July 24, 1962, in Example (a) Col. 27, lines 27 et seq. except that black-and-white (MQ) development was omitted, the color development was reduced to one mnute and was conducted in total darkness until after fixing.

EXAMPLE 2

1,1'-dimethyl-2,2'-di-(3-pyridyl methobromide)-3,3'-indolocarbocyanine bromide

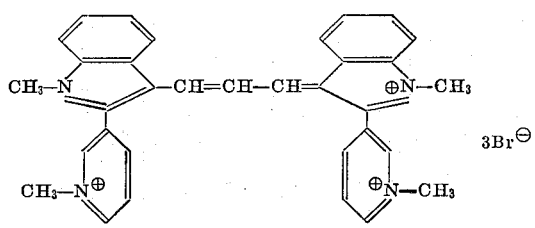

1-methyl - 2 - (3-pyridyl metho p-toluenesulfonate)indole (1.98 g., 2 mol.) was dissolved in hot glacial acetic acid (10 ml.). Trimethoxypropene, 1.0 g., 1 mol. and 200%) and 48% aqueous HBr (1 mol.) were added. The mixture was allowed to cool, then diluted with acetone. The solid was collected and after two recrystallizations from methanol acidified with HBr, the yield of purified dye was 0.44 g. (24%). This dye was photographically tested and found to provide especially useful direct positive materials.

EXAMPLE 3

1,1'-dimethyl-2,2'-di-(4-pyridyl)-3,3'-indolocarbocyanine bromide, dihydrobromide

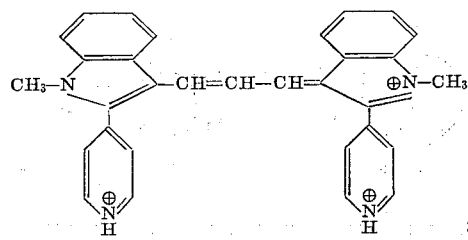

1-methyl-2-(4-pyridyl)indole (2.07 g., 1 mol.) was dissolved in hot glacial acetic acid (20 ml.). Trimethoxypropene (2 mol.) was added, followed by addition of 48% aqueous HBr (2 mol) and the mixture was heated at reflux for 1 minute. The solid which separated on cooling was collected and recrystallized from a mixture of cresol and methanol. The yield of purified dye was 0.35 g. (10%), M.P. >300° C. This dye was tested as in Example 1 and found to be useful for the production of excellent direct positive photographic silver halide emulsions.

EXAMPLE 4

1,1'-dimethyl-2,2'-diphenyl-3,3'-benz[g]indolocarbocyanine bromide

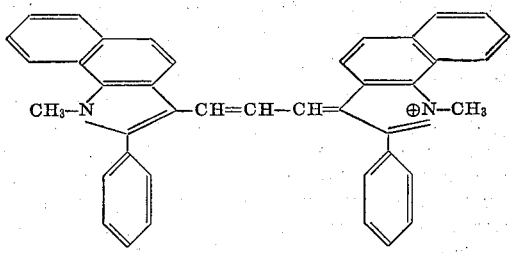

1-methyl-2-phenylbenz[g]indole (2.57 g., 2 mol.) dissolved in hot glacial acetic acid (20 ml.). Trimethoxypropene (2.0 g., 1 mol. and 200%) was added, followed by the dropwise addition of 48% HBr (0.9 ml.). When the mixture had cooled, the product was precipitatd by the addition of ether and the sticky residue stirred with portions of ether until crystalline. After two recrystallizations from methanol (acidified with acetic acid) the yield of purified dye was 0.65 g. (21%), M.P. 230° C. dec.

The above prepared dye compound was photographically tested by the exact procedure of Example 1. Referring to Table I, it will be seen that the dye of this example had a minimum density in exposed areas of 0.06, a sensitivity range up to 685 mμ, and a maximum sensitivity at 640 mμ, whereas the control sample similarly prepared and tested, but containing no spectral sensitizing dye, increases in density with exposure. When a dispersion of a phenolic cyan-forming coupler was incorporated in the emulsion of this example and then this emulsion was photographically tested as in above Example 1, it was found that there was no decrease in sensitivity and excellent reversal results were obtained, whereas a related dye 1,1'-dimethyl-2,2'-diphenyl-3,3' - indolocarbocyanine bromide, when substituted for the dye of this example in such emulsions, showed no reversal on testing. The results are shown in Table II.

EXAMPLE 5

2,2'-diphenyl-1,7,1',7'-ditrimethylene-3,3'-indolcarbocyanine bromide

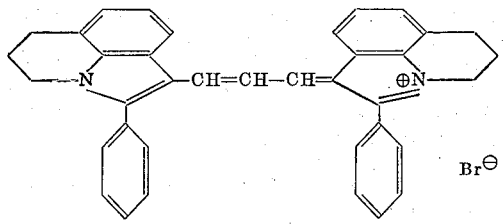

2-phenyl-1,7-trimethyleneindole (1.17 g., 2 mols.) was dissolved in warm acetic acid (10 ml.) and stirred as trimethoxypropene (1.0 g., 1 mol. and 200%) was added, followed by 48% aqueous HBr (0.5 ml.). The mixture was allowed to stand at room temperature overnight. The product was precipitated by addition of ether and washed with portions of ether until crystalline. After one recrystallization from methanol, the yield of purified dye was 0.4 g. (14%), M.P. 213-4° C. dec.

This dye was photographically tested by the exact procedure of Example 1. Referring to Table I, it will be seen that the dye of this example had a minimum density in the exposed areas of 0.11, a sensitivity range up to 710 m$\mu$, and a maximum sensitivity at 650 m$\mu$. When a dispersion of a phenolic cyan-forming coupler was incorporated in the emulsion of this example and then this emulsion was photographically tested as in above Example 1, it was found that there was only a moderate decrease in speed and that excellent reversal results were obtained. However, the related dye 1,1'-dimethyl-2,2'-diphenyl-3,3'-indolocarbocyanine bromide, when substituted for the dye of this example in such emulsion, showed no reversal on testing. Table II lists the results.

EXAMPLE 6

1'-methyl-2,2',10-triphenyl-1,7-trimethylene-3,3'-indolocarbocyanine perchlorate

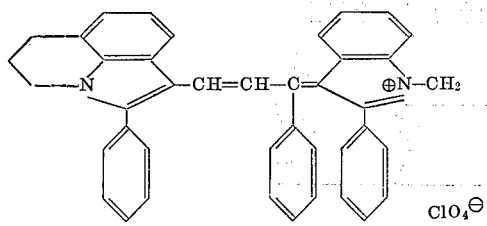

2-phenyl-1,7-trimethyleneindole-3-carboxaldehyde (0.8 g., 1 mol.) and 1-methyl-3-methylenebenzyl-2-phenylindole (0.95 g., 1 ml.) were dissolved in hot acetic acid (10 ml.) and 48% aqueous HBr (0.4 ml.) added. The mixture was allowed to cool, then 70% aqueous perchloric acid (0.3 ml.) in a little ethanol added. The mixture was allowed to stand at room temperature for several hours, then the solid was collected and washed alternately with benzene and methanol until the red impurity had been removed. After two recrystallizations from methanol containing a little HBr, the yield of purified dye was 0.33 g. (16%), M.P. 248-9° C. dec.

This dye was photographically tested by the exact procedure of Example 1. Referring to Table I, it will be seen that the dye of this example had a minimum density in the exposed areas of 0.08, a sensitivity range up to 735 m$\mu$, and a maximum sensitivity at 675 m$\mu$. When a dispersion of a phenolic cyan-forming coupler was incorporated in the emulsion of this example and then this emulsion was photographically tested as in above Example 1, it was found that there was no change in the minimum density, the speed decreased moderately, and excellent reversal results were obtained, whereas related dye 1,1'-dimethyl-2,2',8-triphenyl-3,3'-indolocarbocyanine perchlorate, when substituted for the dye of this example in such emulsion, resulted in a substantial increase in the minimum density, the speed decreased sharply, and reversal was unsatisfactory. The data are shown in Table II.

EXAMPLE 7

1,1'-dimethyl-2,2',12-triphenyl-3-benz[g]indolo-3'-indolo carbocyanine perchlorate

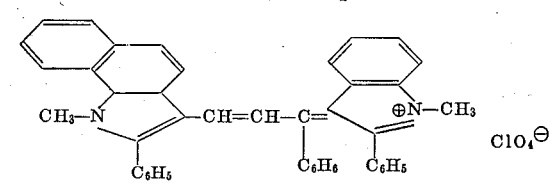

1 - methyl - 2 - phenylbenz[g]indole-3-carboxaldehyde (0.81 g., 1 mol.) and 1-methyl-3-methylenebenzyl-2-phenylindole (0.93 g., 1 mol.) were dissolved in hot acetic acid (10 ml.) and 48% aqueous HBr solution (0.4 ml.) added. When the mixture had cooled, 70% perchloric acid (0.3 ml.) was added. After standing overnight, the solid was collected, washed with benzene then with methanol. After one recrystallization from methanol acidified with HCl, the yield of purified dye was 0.45 g. (21%), M.P. 261-2° C. dec.

The above dye was photographically tested by the exact procedure of Example 1. Referring to Table I, the minimum density in the exposed areas were found to be 0.14, the relative clear speed was indicated at 1450, while the maximum sensitivity was 655 m$\mu$. This dye was found markedly useful for the production of excellent direct positive photographic materials.

EXAMPLE 8

To 9.0 pounds of a silver chloride gelatin emulsion containing an equivalent of 100 grams of silver nitrate was added 0.017 gram of 1,1'-dimethyl-2,2'-di-(3-pyridyl)-3'-3'-indolocarbocyanine bromide, dihydrobromie (dye of Example 1). The emulsion was coated on a non-glossy paper support, and was flashed with white light to give a density of 1.2 when developed in the following developer, diluted 1 part to 2 parts of water:

| | Grams |
|---|---|
| N-methyl-p-aminophenol sulfate | 3.1 |
| Sodium sulfite, des | 45 |
| Hydroquinone | 12 |
| Sodium carbonate, des | 67.5 |
| Potassium bromide | 1.9 |
| Water to 1 liter. | |

The light fogged material thus obtained can be exposed to an image with light modulated by a Wrattan No. 15 filter to give a direct positive image. Similar results are obtained when the dye of Example 3 is substituted for the aforementioned dye of this example.

EXAMPLE 9

Seven pounds of a silver chloride gelatin emulsion containing the equivalent of 100 g. of silver nitrate was heated to 40° C. and the pH was adjusted to 7.8. Eight cc. of full strength (40%) formalin solution was then added and the emulsion was held at 40° C for 10 minutes. At the end of the holding period, the pH was adjusted to 6.0 and 0.125 g. of the dye of Example 5 above was incorporated therein. The emulsion was then coated on a support, and the element so obtained was found to provide good direct positive images. Similar results are obtained when the dye of Example 1 is substituted for the dye of this example.

By substituting other dye compounds of the invention, as defined in Formula I above, into the procedure of the above examples generally similar fogged, direct positive photographic silver halide emulsions and photographic elements may be prepared. For example, other effective dye compounds of the invention include 8-(2-naphthyl)-2,2'-diphenyl-1,7,1',7'-ditrimethylene-3,3' - indolocarbocyanine perchlorate and the corresponding chloride, bromide, iodide, p-toluenesulfonate, etc. salts, 1,1'-dimethyl-10-(2-naphthyl)-2,2'-diphenyl-3,3' - benz[g]indolocarbocyanine perchlorate and the corresponding chloride, bromide, iodide, p-toluenesulfonate, etc. salts, 1,1-dimethyl-2,2',10-triphenyl-3,3'-benz[g]indolocarbocyanine bromide and the corresponding chloride, iodide, p-toluenesulfonate, perchlorate, etc. salts, and the like.

A number of the above prepared dye compounds were photographically tested by the exact procedure of Example 1. The results as shown in Tables 1 and 2 indicate that the dyes of the invention provide excellent direct positive materials.

TABLE I

| Example No. | Dye conc., g./mole | Density in Unexposed Areas | Minimum Density in Exposed Areas | Sens. Max., mμ | Sens. Range, mμ |
|---|---|---|---|---|---|
| 1 | 0.269 | 1.74 | 0.10 | 635 | to 680 |
| 4 | 0.200 | 1.98 | 0.06 | 640 | to 685 |
| 5 | 0.445 | 1.76 | 0.11 | 650 | to 710 |
| 6 | 0.500 | 1.94 | 0.08 | 675 | to 735 |
| 7 | 0.800 | 1.84 | 0.14 | 655 | |

As indicated previously, the cyanine dyes of the invention may be used advantageously in silver halide emulsions containing color couplers. This is quite unexpected since the known indole trimethine cyanine dyes cannot be successfully used in the presence of color couplers. Thus, the dyes of Examples 4, 5 and 6 were added to an emulsion prepared as disclosed in Example 1 with a color coupler, and compared with the related prior art dyes. The data are shown in following Table II.

TABLE II

| Dye | Dye Conc. g/mole | Dispersion | Speed | Density in Unexposed Areas | Minimum Density in Exposed Areas | Sens. Max., mμ | Sens. Range, mμ |
|---|---|---|---|---|---|---|---|
| Ex. 4 | 0.60 | None | | 1.62 | 0.08 | 630 | to 710 |
| Ex. 4 | 0.60 | I | | 1.62 | 0.06 | 640 | to 700 |
| A | 0.187 | None | | 1.66 | 0.05 | 630 | to 685 |
| A | 0.187 | I | | 1.66 | Increase in density with exposure | | |
| Ex. 5 | 0.445 | None | 69 | 1.76 | 0.11 | 650 | to 710 |
| Ex. 5 | 0.445 | I | 38 | 1.90 | 0.24 | 645 | to 695 |
| A | 0.150 | None | 100 | 1.84 | 0.08 | 635 | to 690 |
| A | 0.150 | I | (*) | 1.88 | 1.88 | | |
| Ex. 6 | 0.500 | None | 115 | 1.94 | 0.08 | 675 | to 735 |
| Ex. 6 | 0.500 | I | 30 | 1.88 | 0.08 | 670 | to 710 |
| B | 0.500 | None | 100 | 1.84 | 0.08 | 670 | to 730 |
| B | 0.500 | I | 15.9 | 1.90 | 0.13 | 640 | to 675 |

*No reversal.
Dye A—1,1'-dimethyl-2,2'-diphenyl-3,3'-indolocarbocyanine bromide.
Dye B—1,1'-dimethyl-2,2',8-triphenyl-3,3'-indolocarbocyanine perchlorate.
Dispersion I—A dispersion of a phenolic cyan-forming coupler of the type described in Weissberger et al. U.S. Patent No. 2,474,293, issued June 28, 1949, in 20 g. of di-n-butyl phthalate, 272 g. of 10% gelatin and 20 ml. of 13% Alkanol B (a trade name for an alkylnaphthalene-sodium-sulfonate by E. I. du Pont de Nemours and Co.).

The following examples describe the preparation of various intermediate compounds used in the preceding examples for preparing the cyanine dyes of the invention.

EXAMPLE 10

1-methyl-2-(3-pyridyl)indole

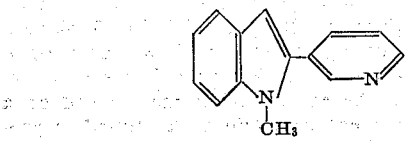

3-acetylpyridine (24.2 g., 1 mol.), 1-methyl-1-phenylhydrazine (24.4 g., 1 mol.) and glacial acetic acid (2.0 ml.) were heated together on a steam bath for 30 minutes as water separated. The mixture was cooled and diluted with ether. The ether layer was separated, dried over MgSO₄, and ether evaporated.

100% phosphoric acid (50 g.) was heated to 100° C. and stirred as the crude hydrazone was added in small portions, at such a rate that the temperature stayed between 125-135° C. When the addition was complete, the mixture was heated in an oil bath at 140° C. for 30 minutes. The mixture was allowed to cool, diluted with water (500 ml.) and made basic by the addition of concentrated aqueous KOH solution. The oil which separated was extracted with ether, the extract dried over MgSO₄ and the ether evaporated. The residue was dissolved in hot EtOH (20 ml.) and the solution chilled. The solid which separated was collected, pressed as dry as possible on a filter, and washed with a very small volume of cold ethanol. The yield of very pale yellow crystals was 19.9 g. (48%), M.P. 79–81° C. This material was used without further purification.

EXAMPLE 11

1-methyl-2-(4-pyridyl)indole

This compound was prepared in a manner similar to above Example 10, except that 4-acetylpyridine (24.2 g., 1 mol.) was used in place of 3-acetylpyridine. The yield was 34.8 g. (84%).

EXAMPLE 12

1-methyl-2-(3-pyridyl metho p-toluenesulfonate)indole

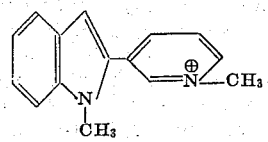

1-methyl-2-(3-pyridyl)indole (5.2 g., 1 mol) and methyl-p-toluenesulfonate (6.6 g., 1 mol and 50%) were warmed together over a small flame and stirred with a thermometer. At 30–40° C., an exothermic reaction started and the flame was removed. The temperature rose to about 130° C. and the mixture set to a cake. The cooled mass was ground with acetone and the solid collected and washed well with acetone. The yield of crude product was 8.97 g. (92%), M.P. 165–9° C. This material was used without further purification.

EXAMPLE 13

1-methyl-2-phenylbenz[g]indole

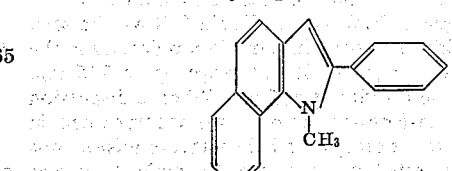

2-phenyl-1H-benz[g]indole (24.3 g., 1 mol) which may be prepared according to Patel and Tedder, J.C.S. 1963, 4593–5, colorobenzene (36 ml.) and water were slurried in a flask fitted with an efficient high-speed stirrer, a thermometer and an additional funnel. 50% NaOH (38 ml.) was added and the mixture stirred and heated to 63° C. The heating was stopped and the mixture stirred vigorously as methyl sulfate (15.1 g., 0.12 ml.) was added slowly, at such a rate that the temperature stayed between 62–65° C. When the addition was complete, the mixture was stirred a further 30 minutes, then diluted to about 250 ml. with water. The chlorobenzene was removed by steam distillation, the residue chilled, and the solid collected and washed well with water and dried. The crude material was dissolved in benzene, chromatographed on an alumina column, and the benzene evaporated. The yield of white crystals was 11.1 g. (43%), M.P. 138.5–139.5° C.

EXAMPLE 14

1-methyl-2-phenylbenz[g]indole-3-carboxaldehyde

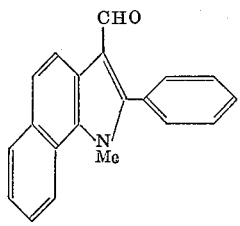

Dimethylformamide (6.0 ml.) was placed in a flask and chilled in an icebath. POCl₃ (3.0 ml.) was added dropwise, then 1-methyl-2-phenylbenz[g]indole (7.7 g.) in warm dimethylformamide (25 ml.) was added in small portions, the temperature being kept below 20° C. during both additions. The mixture was warmed at 35–40° C. for 45 minutes, then poured in ice-water (250 ml.). After brief stirring, a heavy precipitate separated. 5 N NaOH (40 ml.) was added in portions, with stirring, and the mixture heated to boiling, then allowed to cool. The solid was collected and washed thoroughly with water. The yield of colorless crystals was 8.1 g. (95%), M.P. 170–171° C. This material was used for the preparation of dyes without further purification.

Example 15

2-phenyl-7,7-trimethyleneindole

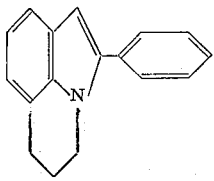

A mixture of 1-phenyl-1-ethylideneamino-1,2,3,4-tetrahydroquinoline (25 g.) and polyphosphoric acid (40 g.) was heated on a steam-bath and constantly stirred with a thermometer. The temperature rose slowly to 110° C., when a vigorous exothermic reaction started. The flask was placed in a cold water bath as the temperature rose to about 210° C. When the mixture had cooled somewhat, 250 ml. of water was added, the mixture heated to boiling then cooled. The aqueous layer was decanted and the residue washed with water. The product was extracted with portions of boiling ether, the extracts combined, and the ether evaporated. The residue was stirred with 25 ml. of cold ether until a suspension of crystalline solid was obtained. The solid was collected and washed with a small volume of ether. The yield was 5.0 g. (21%) M.P. 120–1° C. This material was used without further purification. In this example, the starting material (1-phenyl-1-ethylidenamino-1,2,3,4-tetrahydroquinoline) was prepared by heating on a steam-bath for one hour a mixture of 1-amino-1,2,3,4-tetrahydroquinoline (63.8 g., 1 mol.) [which can be prepared by the method of Kost et al., Zhur Obs. Khim. 29, 1949–53 (1959)] acetophenone (57.1 g., 1 mol) and glacial acetic acid (2 ml.). Ethanol (100 ml.) was added and the mixture heated to boiling, when a clear solution was obtained. On chilling the solution, the product separated in large yellow crystals, which were collected and washed with a little ethanol. Yield, 84.9 g. (79%), M.P. 83–84° C. This material was used without further purification.

EXAMPLE 16

2-phenyl-1,7-trimethyleneindole-3-carboxaldehyde

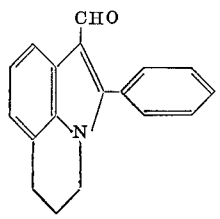

Phosphoryl chloride (4.2 ml.) was added slowly to dimethylformamide (10 ml.), keeping the temperature below 20° C. by cooling in an ice-bath. A solution of 2-phenyl-1,7-trimethylene-indole (8.0 g.) in warm dimethylformamide (20 ml.) was added slowly, maintaining the temperature below 20° C. The mixture was warmed at 35–40° C. for 1 hour, then poured into water (250 ml.). 5 N sodium hydroxide (48 ml.) was added slowly, with stirring. The aqueous layer was decanted from the sticky material which separated. The residue was boiled and stirred with ethanol (25 ml.), then chilled. The solid was collected and washed with a small volume of ethanol. The yield was 5.75 g. (64%). This material was used without further purification. A small sample, recrystallized from ethanol, had M.P. 143–4° C.

The photographic silver halide emulsion and other layers present in the photographic elements made according to the invention can be hardened with any suitable hardener, including aldehyde hardeners such as formaldehyde, and mucochloric acid, aziridine hardeners, hardeners which are derivatives of dioxane, oxypolysaccharides such as oxy starch or oxy plant gums, and the like. The emulsion layers can also contain additional additives, particularly those known to be beneficial in photographic emulsions, including, for example, lubricating materials, stabilizers, speed increasing materials, absorbing dyes, plasticizers, and the like. These photographic emulsions can also contain in some cases additional spectral sensitizing dyes. Furthermore, these emulsions can contain color forming couplers or can be developed in solutions containing couplers or other color generating materials. Among the useful color formers are the monomeric and polymeric color formers, e.g., pyrazolone color formers, as well as phenolic, heterocyclic and open chain couplers having a reactive methylene group. The color forming couplers can be incorporated into the direct positive photographic silver halide emulsion using any suitable technique, e.g., techniques of the type shown in Jelley et al., U.S. Patent 2,322,027, issued June 15, 1943, Fierke et al., U.S. Patent 2,801,171, issued July 30, 1957, Fisher, U.S. Patents 1,055,155 and 1,102,028, issued Mar. 4, 1913, and June 30, 1914, respectively, and Wilmanns, U.S. Patent 2,186,849, issued Jan. 9, 1940. They can also be developed using incorporated developers such as polyhydroxybenzenes, aminophenols, 3-pyrazolidones, and the like.

Although the invention has been described in considerable detail with particular reference to certain preferred embodiments thereof, it will be understood that variations and modifications can be effected within the spirit and scope of the invention as described hereinabove, and as defined in the appended claims.

We claim:
1. A fogged direct positive photographic silver halide emulsion containing at least one cyanine dye compound selected from those having two indole nuclei, each re- spective nucleus being joined through the 3-carbon atom thereof to one of the respective terminal carbon atoms of a trimethine chain, at least one of said nuclei being 2-aromatically substituted and having a substituent selected from the group consisting of (1) a fused non-heterocyclic aromatic ring attached to the benzene ring of the indole nucleus; (2) a 1,7-alkylene bridge; and (3) a heterocyclic aromatic nucleus attached to the 2-carbon atom of the indole nucleus.

2. A fogged direct positive photographic silver halide emulsion comprising a dye represented by the following general formula:

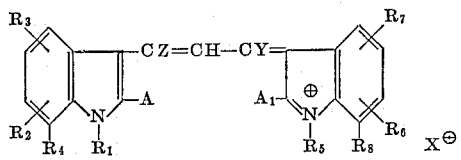

wherein A represents a substituent selected from the group consisting of a nonheterocyclic aryl radical and a heterocyclic radical containing from 5 to 6 atoms, and the heteroatom is selected from the group consisting of nitrogen, sulfur, selenium and oxygen; $R_2$ and $R_3$ each represents a substituent selected from the group consisting of hydrogen, an alkyl radical, halogen and, taken together, the atoms necessary to complete a fused non-heterocyclic aromatic ring having 6 carbon atoms; $R_1$ represents an alkyl radical; $R_4$ represents a substituent selected from the values given for $R_2$ and, taken together with $R_1$, an alkylene bridge; X represents an anion; and $A_1$, $R_5$, $R_6$, $R_8$ and $R_8$ each are selected from same values, respectively, as A, $R_1$, $R_2$, $R_3$ and $R_4$; and, Z and Y each represents a substituent selected from the group consisting of a hydrogen atom and an aromatic radical; at least one of said indole nuclei containing a substituent selected from the group consisting of said heterocyclic radical, said fused non-heterocyclic aromatic ring and said alkylene bridge.

3. A direct positive photographic emulsion in accordance with claim 2 wherein said dye compound is a trimethine dye wherein each of said indole nuclei contains a substituent selected from the group consisting of said heterocyclic radical, said fused non-heterocyclic aromatic ring and said alkylene bridge.

4. A direct positive photographic emulsion in accordance with claim 2 in which said silver halide is present in the form of light fogged silver halide grains.

5. A direct positive photographic emulsion in accordance with claim 2 in which said silver halide is present in the form of chemically fogged silver halide grains.

6. A fogged direct positive photographic silver halide emulsion containing a dye selected from the group consisting of: 1,1'-dimethyl-2,2'-di-(3-pyridyl)-3,3' - indolocarbocyanine salt; 1,1'-dimethyl-2,2'-di-(3-pyridyl metho salt)-3,3'-indolocarbocyanine salt; 1,1'-dimethyl-2,2' - diphenyl-3,3'-benz[g]indolocarbocyanine salt; 2,2' - diphenyl-1,7,1',7'-ditrimethylene-3,3' - indolocarbocyanine salt; 1'-methyl-2,2',10-triphenyl-1,7-trimethylene-3,3' - indolocarbocyanine salt; 1,1'-dimethyl-2,2',12 - triphenyl-3-benz [g] indolo-3'-indolocarbocyanine salt; and 2,2'-diphenyl-1,7,1',7'-ditrimethylene-3,3'-indolocarbocyanine salt.

7. A direct positive photographic emulsion in accordance with claim 2 containing a photographic color coupler.

8. A photographic element comprising a support coated with at least one layer containing a direct positive photographic silver halide emulsion of claim 2.

9. A photographic element comprising a support coated with at least one layer containing a direct positive photographic silver halide emulsion of claim 3.

10. A direct positive, photographic emulsion in accordance with claim 2 which comprises fogged silver halide grains, said grains being such that a test portion thereof, when coated as a photographic silver halide emulsion on a support to give a maximum density of at least about 1 upon processing for 6 minutes at about 68° F. in Kodak DK-50 developer, has a maximum density which is at least about 30% greater than the maximum density of an identical coated test portion which is processed for 6 minutes at about 68° F. in Kodak DK-50 developer after being bleached for about 10 minutes at about 68° F. in a bleach composition of:

Potassium cyanide—50 mg.
Acetic acid (glacial)—3.47 cc.
Sodium acetate—11.49 g.
Potassium bromide—119 mg.
Water to 1 liter.

11. A direct positive, photographic emulsion in accordance with claim 2 which comprises fogged silver halide grains, at least 95%, by weight, of said grains having a size which is within about 40% of the average grain size.

12. A direct positive, photographic emulsion in accordance with claim 6 which comprises fogged silver halide grains, said grains being such that a test portion thereof, when coated as a photographic silver halide emulsion on a support to give a maximum density of at least about 1 upon processing for 6 minutes at about 68° F. in Kodak DK-50 developer, has a maximum density which is at least about 30% greater than the maximum density of an identical coated test portion which is processed for 6 minutes at about 68° F. in Kodak DK-50 developer after being bleached for about 10 minutes at about 68° F. in a bleach composition of:

Potassium cyanide—50 mg.
Acetic acid (glacial)—3.47 cc.
Sodium acetate—11.49 g.
Potassium bromide—119 mg.
Water to 1 liter.

13. A direct positive, photographic emulsion in accordance with claim 6 which comprises fogged silver halide grains, at least 95%, by weight, of said grains having a size which is within about 40% of the average grain size.

References Cited

UNITED STATES PATENTS 2,930,694   3/1960   Coenen et al. _____ 96—106 X

NORMAN G. TORCHIN, Primary Examiner

R. E. FICHTER, Assistant Examiner

U.S. Cl. X.R.

96—107; 260—240, 65